(12) United States Patent
Liang et al.

(10) Patent No.: US 7,459,121 B2
(45) Date of Patent: Dec. 2, 2008

(54) METHOD FOR CONTINUOUS FABRICATION OF CARBON NANOTUBE NETWORKS OR MEMBRANE MATERIALS

(75) Inventors: Zhiyong Liang, Tallahassee, FL (US); Ben Wang, Tallahassee, FL (US); Chun Zhang, Tallahassee, FL (US); Jonnattan T. Ugarte, Tallahassee, FL (US); Chih-Yen Lin, Tallahassee, FL (US); James Thagard, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 546 days.

(21) Appl. No.: 11/185,513

(22) Filed: Jul. 20, 2005

(65) Prior Publication Data
US 2006/0207931 A1      Sep. 21, 2006

Related U.S. Application Data

(60) Provisional application No. 60/589,681, filed on Jul. 21, 2004.

(51) Int. Cl.
*B29C 39/14*   (2006.01)
*B01D 61/00*   (2006.01)
*D01F 9/12*    (2006.01)

(52) U.S. Cl. .......................... 264/555; 264/41; 264/902; 210/650; 423/447.1; 423/461; 977/755; 977/742; 438/99

(58) Field of Classification Search ............ 210/500.27, 210/502.1, 490, 650; 423/447.1, 461; 264/140, 264/41, 4.1, 55, 902; 428/408, 367; 977/753, 977/755, 742; 524/495; 438/99
See application file for complete search history.

(56) References Cited

U.S. PATENT DOCUMENTS 4,952,317 A * 8/1990 Culkin ..................... 210/636

(Continued)

FOREIGN PATENT DOCUMENTS

WO   WO2006/127884   * 11/2006

OTHER PUBLICATIONS

Gou, et al., Title: "Development of Nanotube Bucky Paper/Epoxy Nanocomposites," Proceedings of the TEXCOMP-6 International Symposium on Textile Composites, Sep. 11-13, 2002, pp. 1-5.

(Continued)

*Primary Examiner*—Ana M Fortuna
(74) *Attorney, Agent, or Firm*—Sutherland Asbill & Brennan LLP

(57) ABSTRACT

Methods and devices are provided for the continuous production of a network of nanotubes or other nanoscale fibers. The method includes making a suspension of nanoscale fibers dispersed in a liquid medium, optionally with surfactant and/or sonication, and filtering the suspension by moving a filter membrane through the suspension, such that the nanoscale fibers are deposited directly on the filter membrane as the fluid medium flows through the filter membrane, thereby forming a continuous membrane of the nanoscale fibers. The deposition of the nanoscale fibers can occur when and where the filter membrane moves into contact with a static, porous filter element or a dynamic, porous filter element. The filtering can be conducted within a magnetic field effective to align the nanoscale fibers, and/or with the aid of vacuum to pull water through the filter membrane, applied pressure to press water though the filter membrane, or a combination thereof.

21 Claims, 5 Drawing Sheets

U.S. PATENT DOCUMENTS

| | | | |
|---|---|---|---|
| 6,036,857 | A | 3/2000 | Chen et al. |
| 7,011,760 | B2* | 3/2006 | Wang et al. ................. 210/660 |
| 7,105,596 | B2* | 9/2006 | Smalley et al. .............. 524/495 |
| 7,125,533 | B2* | 10/2006 | Khabashesku et al. ... 423/447.1 |
| 7,168,841 | B2* | 1/2007 | Hsieh et al. ................. 362/613 |
| 7,205,069 | B2* | 4/2007 | Smalley et al. .............. 429/129 |
| 7,261,852 | B2* | 8/2007 | Rinzler et al. ............... 264/317 |
| 7,297,278 | B2* | 11/2007 | Steele et al. ................. 210/650 |
| 7,323,033 | B2* | 1/2008 | Kroupenkine et al. .......... 95/45 |
| 7,354,563 | B2* | 4/2008 | Smalley et al. ........... 423/447.1 |
| 2003/0146529 | A1 | 8/2003 | Chen et al. |
| 2004/0065969 | A1 | 4/2004 | Chatterjee et al. |
| 2005/0239948 | A1 | 10/2005 | Haik et al. |
| 2006/0017191 | A1 | 1/2006 | Liang et al. |

OTHER PUBLICATIONS

Wang, et al., Title: "Fabrication and Characterization of In-Plane Aligned Nanotube Composites with Magnetically Aligned Carbon Nanotube Bucky Papers," Proc. 14th Int. Conf. on Composite Materials (ICCM-14), 1 (San Diego, CA, Jul. 14-18), - (2003) pp. 1-7.

Gou, et al., Title: "Process Analysis and Optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003, pp. 1-12.

Liang, et al., "Molecular Dynamic Simulation and Experimental Investigation of Filling Chopped SWNTS with Resin Matrix Molecules to Enhance Interfacial Bonding and Loading Transfer in Nanocomposites," SAMPE 2004, Long Beach, CA, May 16-20, 2004, pp. 1-8.

Endo, et al., Title: "Buckypaper from Coaxial Nanotubes," Nature/ Vol.433/3 Feb. 2005/www.nature.com/nature;pp. 476.

Dai, Title: "Carbon Nanotubes Opportunities and Challenges," Surface Science 500 (2002), pp. 218-241.

Ajayan, et al., "Aligned Carbon Nanotube Arrays Formed by Cutting a Polymer Resin-Nanotube Composite", Science, vol. 265, pp. 1212-1214 (1994).

Ajayan, et al., "Single-Walled Carbon Nanotube-Polymer Composites: Strength and Weakness," Advanced Materials12:750-753 (2000).

Andrews, et al., "Nanotube composite carbon fibers", Applied Physics Letters, 75(9): pp. 1329-1331 (1999).

Chauvet, et al., "Magnetic anisotropies of aligned carbon nanotubes", The American Physical Society, 52(10): pp. 6963-6966 (1995).

Chen, et al., "Electrochemical synthesis of polypyrrole/carbon nanotube nanoscale composites using well- aligned carbon nanotube arrays", Applied Physics A, vol. 73, pp. 129-131 (2001).

Cooper, et al., "Distribution and Alignment of Carbon Nanotubes and Nanofibrils in a Polymer Matrix," Composites Science and Technology62:1105-1112 (2002).

de Heer, et al., "Aligned Carbon Nanotube Films: Production and Optical and Electronic Properties," Science268:845-847 (1995).

Dresselhaus, et al., "Graphite Fiber and Filament," M. Cardon, Ed., pp. 12-34 (1988).

Fan, et al., "Self-Oriented Regular Arrays of Carbon Nanotubes and Their Field Emission Properties," Science 283:512-514 (1999).

Fujiwara, et al., "Magnetic Orientation and Magnetic Properties of a Single Carbon Nanotube", The Journal Physical Chemistry, 105(18): pp. 4383-4386 (2001).

Garg, et al., "Effect of chemical functionalization on the mechanical properties of carbon nanotubes", Chemical Physics Letters, 295(4): pp. 273-278 (1998). Abstract.

Gou, et al., "Experimental Design and Optimization of Dispersion Process for Single-Walled Carbon Nanotube Bucky Paper," International Journal of Nanosciencel. pp. 1-12, Feb. 2, 2002.

Hertel, et al., "Deformation of Carbon Nanotubes by Surface van der Waals Forces," Physical Review B. 58:13870-19873 (1998).

Holloway, et al., "Texture Development Due to Preferential Grain Growth of Ho-Ba-Cu-O in 1.6-T Magnetic Field," J. Mat. Res. 8:727-733 (1993).

Knez, et al., "Electrochemical modification of individual nano-objects," Journal of Electroanalytical Chemistry, vol. 522: pp. 70-74 (2002).

Kumar, et al., "Fibers from Polypropylene/Nano Carbon Fiber Composites," Polymer43:1701-1703 (2002).

Kyotani, et al., "Preparation of Ultrafine Carbon Tubes in Nanochannels of an Anodic Aluminum Oxide Film," Chem. Mater. 8:2109-2113 (1996).

Li, et al., "Large-Scale Synthesis of Aligned Carbon Nanotubes," Science274:1701-1703 (1996).

Lourie, et al., "Evaluation of Young's modulus of carbon nanotubes by micro-Raman spectroscopy", Journal of Materials Research, 13(9): pp. 2418-2422 (1998).

Ni, et al., "Chemical Functionalization of Carbon Nanotubes through Energetic Radical Collisions," Physical Review B. 61:R16343-R16346 (2000).

Qian, et al., "Load transfer and deformation mechanisms in carbon nanotube-polystyrene composites", Applied Physics Letters, 76(20): pp. 2868-2870 (2000).

Smith, et al., "Structural anisotropy of magnetically aligned single wall carbon nanotube films ", Applied Physics Letters, 77(5): pp. 663-665 (2000).

Stéphan, et al., "Characterization of singlewalled carbon nanotubes-PMMA composites", Synthetic Metals, 108(2): pp. 139-149 (2000). Abstract.

Thostenson, et al., "Nanocomposites in context," Composites Science and Technology65: 491-516 (2005).

Treacy, et al., "Exceptionally High Young's Modulus Observed for Individual Carbon Nanotubes," Nature381:678-680 (1996).

Velasco-Santos, et al., "Chemical Functionalization of Carbon Nanotubes through an Organosilane," Nanotechnology13:495-498 (2000).

Velasco-Santos, et al., "Chemical functionalization of carbon nanotubes through an organosilane", Nanotechnology,vol. 13, pp. 495-498 (2002). Abstract.

Wang, et al., "Growth and characterization of buckybundles", Applied Physics Letters, 62(16): pp. 1881-1883 (1993).

Wood, et al., "Orientation of Carbon Nanotubes in Polymers and its Detection by Raman Spectroscopy," Composites: Part A32:391-399 (2001).

* cited by examiner

METHOD FOR CONTINUOUS FABRICATION OF CARBON NANOTUBE NETWORKS OR MEMBRANE MATERIALS

CROSS-REFERENCE TO RELATED APPLICATIONS

This application claims the benefit of U.S. Provisional Application No. 60/589,681, filed Jul. 21, 2004. The application is incorporated herein by reference in its entirety.

BACKGROUND OF THE INVENTION

This invention relates generally to carbon nanotubes, and more particularly to methods for aligning carbon nanotubes in the production of composite materials and devices.

The exceptional mechanical properties of carbon nanotubes can be used in the development of nanotube-based, high performance structural and multifunctional nanostructural materials and devices. Carbon nanotubes are only at most several nanometers in diameter and up to several microns in length. Thus, strong interactions occur between each nanotubes due to the van der Waals forces, making good tube dispersion, desirable tube alignment and high tube loading in nanocomposites exceptionally difficult if not impossible to achieve using conventional manufacturing methods.

Many applications, such as electrical conducting, thermal conducting and high performance nanocomposites, could be achieved by preforming nanotubes into a network or membrane (5-200 μm in thickness) with controlled nanostructures (dispersion, alignment and loading). These membranes would also make nanotube materials and their properties capable of transfer into a macroscale material for easy handling. These preformed nanotube networks are also called buckypapers in literature.

Buckypapers are produced by a multiple-step process of dispersing nanotubes into a suspension and filtering the produced suspension. The produced buckypapers can be easily handled similar to conventional surface veil or glass materials. However, all the existing manufacturing techniques for nanotube membranes are discontinuous processes and can only produce small quantities and very short membrane materials, which are serious barriers for future practical applications of nanotube membranes.

Current discontinuous techniques can only produce nanotube membrane materials by filtering nanotube suspension, and the dimensions are limited by the filter dimension. In these techniques, a well-dispersed nanotube suspension is first prepared by the aid of selected surfactant and sonication. Then, a filtration system with a filter membrane of 0.1~2 μm pore size is employed to filter the prepared suspension with the aid of vacuum or pressure. During the filtration, nanotubes will deposit onto the surface of the filter membrane to form a nanotube network. After filtration, the produced nanotube film or buckypaper can be peeled off from the filter membrane. Producing large quantities of buckypapers requires frequent changing of the filters. Current processes use many filters to complete the filtration and limit manufacture of the buckypapers to piece by piece, which is time consuming, costly and also difficult to ensure consistent product quality. More importantly, due to the limitation of filter dimension, the product membranes are of a limited length (usually less than one foot). Therefore, it would be highly desirable to provide a high quality and continuous nanotube membranes, or buckypaper materials, to increase the breadth and variety of applications in which nanotube materials can be effectively used. It would be particularly desirable to be able to construct long and continuous thermal and electrical paths in large structures or devices using carbon nanotubes in a continuous nanotube membrane or buckypaper form.

SUMMARY OF THE INVENTION

Methods and devices are provided for the continuous production of a network of nanotubes or other nanoscale fibers. In one aspect, the method comprises making a suspension of nanoscale fibers dispersed in a liquid medium, and filtering the suspension by moving a filter membrane through the suspension, such that the nanoscale fibers are deposited directly on the filter membrane as the fluid medium flows through the filter membrane, thereby forming a continuous membrane of the nanoscale fibers. In one embodiment, the deposition of the nanoscale fibers occurs when and where the filter membrane moves into contact with a static, porous filter element. In another embodiment, the deposition of the nanoscale fibers occurs when and where the filter membrane moves into contact with a dynamic, porous filter element. For example, the filter element can be a rotary element which is mechanically driven to rotate and at least partially assist in moving the filter membrane across the filter element.

In one embodiment, the suspension is subjected to sonication prior to the filtration step. In one embodiment, the filtering step is conducted within a magnetic field effective to align the nanoscale fibers. In various embodiments, the filtration step is conducted with the aid of vacuum to pull water through the filter membrane, applied pressure to press water though the filter membrane, or a combination thereof.

In one embodiment, the nanoscale fibers comprise carbon nanotubes, such as single wall nanotubes.

In various embodiments of the method, the suspension includes a solvent selected from the group consisting of water, ether, acetonitrile, and combinations thereof. The suspension of nanoscale fibers may include one or more surfactants. In one embodiment, the nanoscale fiber concentration in the suspension is between about 40 and 500 mg/l.

In one preferred embodiment, the filter membrane comprises a polytetrafluoroethylene, a nylon, or a combination thereof. In one embodiment, the filter membrane has pores having a size between about 0.1 μm and about 5 μm.

In one particular embodiment for the continuous production of a network of carbon nanotubes, the method comprises making a suspension of carbon nanotubes dispersed in a liquid medium; and filtering the suspension by moving a filter membrane through the suspension, such that the carbon nanotubes are deposited directly on the filter membrane as the fluid medium, with the aid of vacuum or applied pressure, flows through the filter membrane, thereby forming a continuous membrane of the carbon nanotubes.

In another aspect, a method is provided for making a nanocomposite material. In one embodiment, the method comprises taking a continuous membrane of nanoscale fibers made as described herein, impregnating pores of the membrane with a liquid matrix material, and then solidifying the liquid matrix material. In various embodiments, the liquid matrix material comprises a polymer precursor or thermoplastic polymer. In various embodiments, the impregnation step is done with the aid of vacuum, direct pressure means, or both.

In yet another aspect, a nanocomposite material is provided which comprises the continuous membrane of nanoscale fibers made by the methods described herein. In one embodiment, the nanocomposite material comprises a continuous membrane of aligned nanotubes made by the methods described herein.

BRIEF DESCRIPTION OF THE FIGURES

FIG. 5A is a perspective view, and FIG. 5B is another perspective view with part of the device removed to view internal components.

DETAILED DESCRIPTION OF THE PREFERRED EMBODIMENTS

Methods have been developed for fabricating networks of nanoscale fibers, randomly oriented or magnetically aligned, in a continuous process. The methods can be used to produce nanotube buckypaper or other nanoscale fiber films/membranes having a thickness between about 1 and about 200 μm, with various degrees of porosity. The lengths and widths of these films/membranes are limited only by the size and/or operational limitations of the process equipment.

The methods can be used to make preformed nanotube networks and transfer nanoscale fiber materials into macroscale thin membrane forms, which can be easily handled and used similarly to conventional thin films or glass mat materials in various applications. Therefore, the methods for continuously producing nanotube buckypaper materials provide a means for effectively and affordably using nanotubes in a number of applications.

As used herein, the terms "comprise," "comprising," "include," and "including" are intended to be open, non-limiting terms, unless the contrary is expressly indicated.

The Continuous Processes, Equipment and Materials

Figure 1:
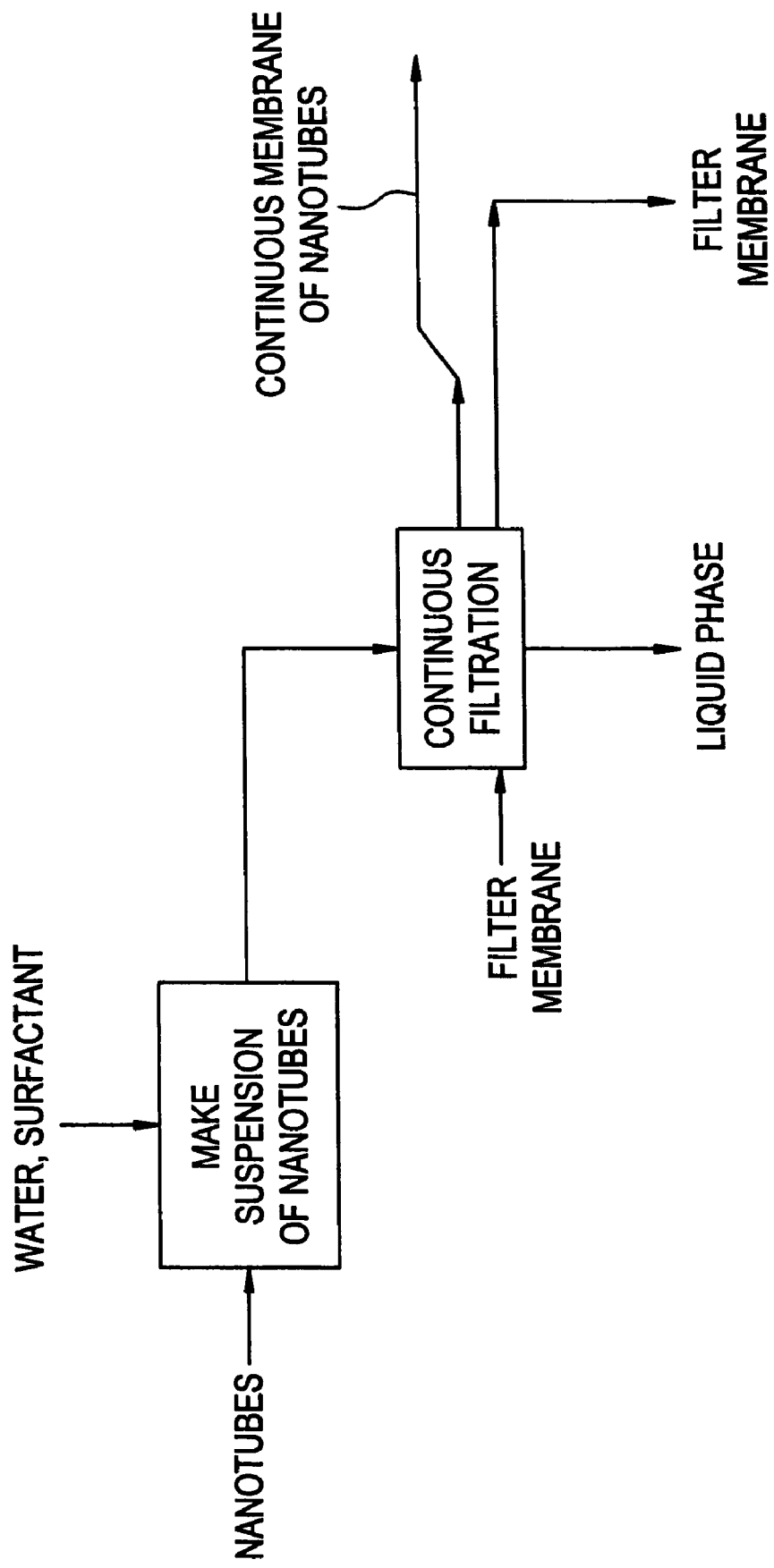
FIG. 1 is a process flow diagram of a process for making a continuous network of nanoscale fibers.

In one aspect, methods are provided for the continuous production of a network of nanotubes or other nanoscale fibers. Generally, the method includes the steps of making a suspension of nanoscale fibers dispersed in a liquid medium; and then filtering the suspension by moving a filter membrane through the suspension, such that the nanoscale fibers are deposited directly on the filter membrane as the fluid medium flows through the filter membrane, thereby forming a continuous membrane of the nanoscale fibers. After the continuous membrane of the nanoscale fibers is sufficiently dried, it can be separated from the filter membrane. See FIG. 1.

Making the Suspension

The first step in making the continuous network of nanoscale fibers involves making a suspension of the nanoscale fibers. That is, dispersing the nanoscale fibers in a non-solvent liquid processing medium.

The Nanoscale Fibers

As used herein, the term "nanoscale fibers" refers to a thin, greatly elongated solid material, typically having a cross-section or diameter of less than 500 nm. In a preferred embodiment, the nanoscale fibers comprise or consist of carbon nanotubes, including both single wall nanotubes (SWNTs) and multiple-walled carbon nanotubes (MWNTs). As used herein, the terms "carbon nanotube" and the shorthand "nanotube" refer to tubular graphite usually capped with fullerene structures at ends, a synthetic material, which typically has a wide molecular weight range depending on the diameter and length. Carbon nanotubes are commercially available from companies such as Carbon Nanotechnologies, Inc. (Houston, Tex. USA), or can be made using techniques known in the art. In a preferred embodiment, the nanotube is a single wall nanotube, or SWNT. The SWNT can be pristine, in which the carbon fullerene tube has fullerene end caps, or the SWNT can be non-pristine, for example, where the pristine SWNT has been chemically or mechanically chopped and then optionally functionalized to convert dangling carbon atoms to different functional groups, such as carbonyl or other oxygen containing groups.

The methods described herein also can be applied to other nanoscale fibrous materials besides nanotubes, including carbon nanofibers and various nanoscale rods and fibrous materials, which generally have a diameter less than 500 nm. Carbon nanofibers (CNFs) are filamentous fibers that resemble whiskers of multiple graphite sheets or MWNTs.

The Liquid Processing Medium

Essentially any non-solvent liquid medium can be used to process the nanoscale fibers into a continuous network. As used herein, the term "nonsolvent" refers to liquid media that essentially are non-reactive with the nanoscale fibers and in which the nanoscale fibers are virtually insoluble. Examples of suitable nonsolvent liquid media include water, volatile organic liquids, such as acetone, ethanol, methanol, n-hexane, ether, acetonitrile, chloroform, DMF and mixtures thereof. Low-boiling point solvents are typically preferred so that the solvent can be easily and quickly removed, facilitating drying of the continuous nanoscale fiber network.

In a various embodiments, the liquid medium includes one or more surfactants (e.g. dispersants, anti-flocculants) to maintain the suspension and/or other chemical agents to facilitate network formation or dewatering. For example, BYK-9076 (from BYK Chem USA), Triton X-100, dodecylbenzenesulfonic acid sodium salt (NaDDBS), and SDS may be used. However, sometimes, a surfactant may not be needed if the nanoscale fiber can form a stable suspension without it.

Dispersing the Nanoscale Fibers in the Liquid Medium

Before the filtration step, it is desirable that the nanoscale fibers be well dispersed in the liquid medium. To facilitate dispersion and minimize agglomeration, the nanoscale fibers concentration in the liquid medium preferably is less than 500 mg/L. In one embodiment, the nanotube concentration is between about 25 and about 150 mg/L, and more preferably between about 40 and 100 mg/L.

Generally, the nanoscale fibers are added to a quantity of the liquid medium under mixing conditions using one or more agitation means known in the art. In one embodiment, the mixture is subjected to sonication using conventional sonication equipment. The nanoscale fibers suspension can be made in a batch process or in a continuous process.

Filtration and Network Formation

The second step in making the continuous network of nanoscale fibers involves filtering the suspension by moving a filter membrane through the suspension, such that the nanoscale fibers are deposited directly on the filter membrane as the fluid medium flows through the filter membrane, to form the continuous membrane of the nanoscale fibers. In one embodiment, deposition of the nanoscale fibers occurs when and where the filter membrane moves into contact with a static, porous filter element. In an alternative embodiment, deposition of the nanoscale fibers occurs when and where the filter membrane moves into contact with a dynamic, porous filter element. For example, the dynamic filter element can be a rotary element which is mechanically driven to rotate and at least partially assist in moving the filter membrane across the filter element.

The rotating filter (which is a porous medium to support filter membrane and filtrate suspension) rotates and allows the filter membrane to continuously move on its surface during filtration. Therefore, the nanotubes or other nanoscale fibers in the suspension can be continuously deposited onto the surface of the moving filter membrane to produce a continuous tube network. The speed at which the filter membrane is moved—the speed at which the nanoscale fiber network is created—depends upon the desired properties (e.g., thickness) of the network and other operating conditions (e.g., strength of vacuum, nanoscale fiber concentration in the suspension, and mechanical strength and other properties of the filter membrane).

In one embodiment, the filtration step is conducted with the aid of vacuum to pull the liquid medium through the filter membrane. Alternatively, or in addition, the filtration step may utilize an applied pressure to push the liquid medium through the filter membrane. The amount of vacuum required depends on factors such as the porosity of the filter membrane, the viscosity of the liquid medium, speed of movement of the filter membrane, and nanoscale fiber concentration in the suspension. All of these parameters can be manipulated to achieve the desired characteristics of the nanoscale fiber network, including the thickness and porosity of the continuous network.

In a preferred aspect, the filtering step is conducted within a magnetic field effective to align the nanoscale fibers. (Without the magnetic field, the continuous membrane comprises randomly oriented nanoscale fibers, rather than aligned nanoscale fibers.) For example, the visible alignment of SWNTs and nanofibers can be achieved using a magnet with a field strength greater than 1 Tesla. In one embodiment, the method includes the use of a magnetic field effective to align the nanoscale fibers in the fluid medium during formation of the continuous network on the filter membrane. Once the fluid medium is removed and the network (e.g., the buckypaper) is formed, then the magnetic field can be removed (or the network removed from the magnetic field) and the aligned nanoscale fibers will maintain their alignment in the network.

Figure 4:
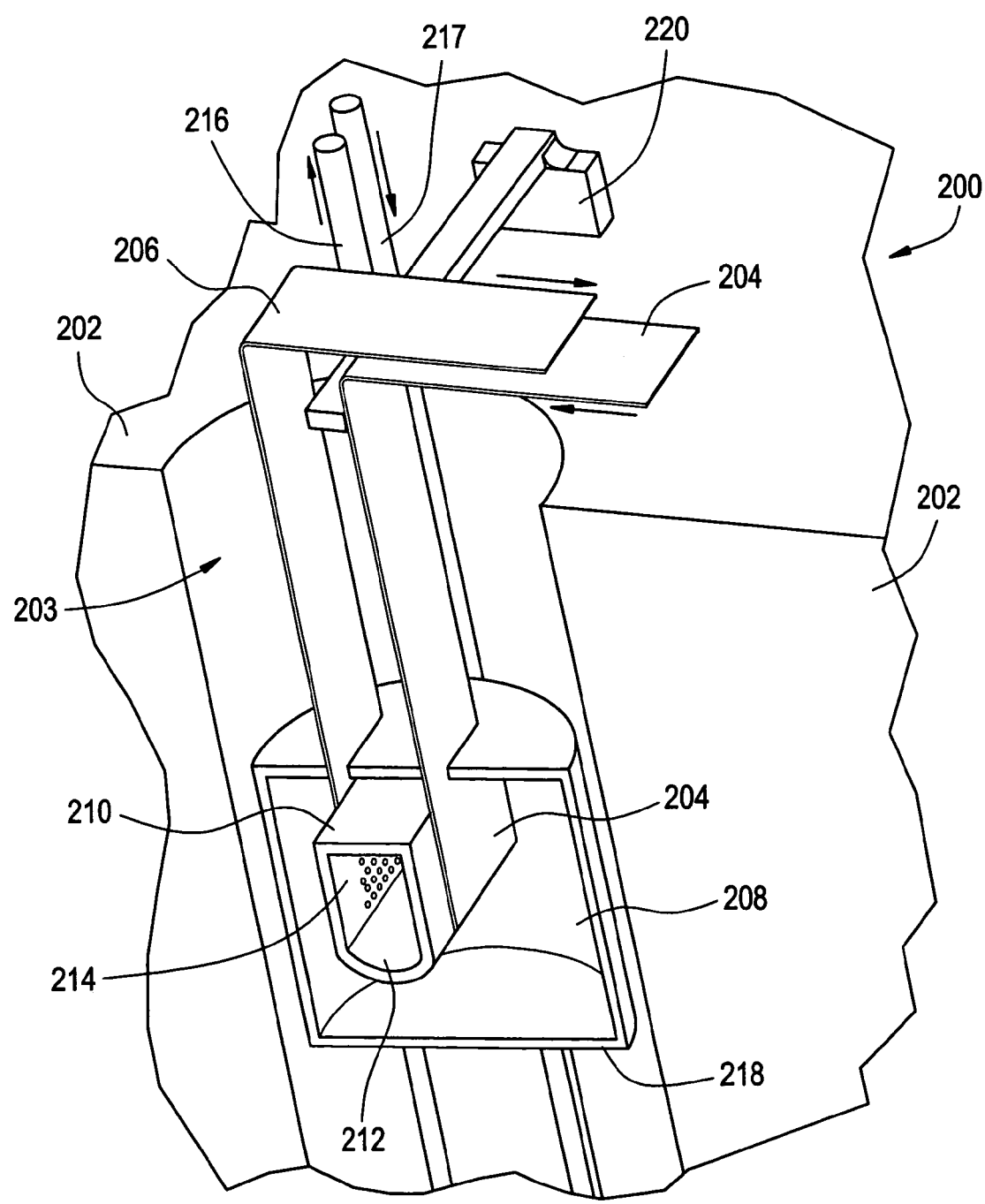
FIG. 4 is cross-sectional and perspective view of one embodiment of an apparatus for continuously making a nanoscale fiber membrane, which apparatus includes a magnet for aligning the nanoscale fibers.

One embodiment of a process design for making a continuous network of aligned nanoscale fibers is shown in FIG. 4. Apparatus 200 includes a magnet 202 which has an cylindrical annular cavity 203. Inside the cavity of the magnet is a container 218 for holding a suspension 208 of nanoscale fibers. Inside the container, submerged in the suspension, is a filter element 210, which includes a filter cavity 212 and a porous surface 214. A moving filter membrane 204, in a long strip form, is fed continuously into the suspension, passing snuggly against the porous surface of the filter element. The liquid medium of the suspension is pulled through the filter membrane, through the porous surface of the filter element, into the filter cavity, and exits the device through line 216, causing a continuous membrane or network of nanoscale fibers to form on the surface of the filter membrane. This continuous network 206 formed on the filter membrane then exits the suspension and cavity for further processing. The device may include one or more guides 220 for directing the moving filter membrane into and out of the suspension and magnet cavity. Line 217 supplies fresh suspension of nanoscale fibers to the container 218.

In one embodiment, the filter membrane is formed of or coated with a polytetrafluoroethylene (e.g., TEFLON™, E. I. Du Pont de Nemours & Co.). In one embodiment, the filter membrane has pores between about 0.1 μm and about 5 μm in diameter. In one example, the pore size is from 0.1 to 2 μm. In another example, the pore size is 0.45 μm. Other materials of construction and pore sizes, such as Nylon or paper materials, can be readily selected as needed for particular process design or product design needs.

Uses of the Nanoscale Fiber Membranes Made by the Continuous Methods

The continuous nanotube membrane or buckypaper materials made by the methods described herein can be used in various applications, including high performance nanocomposite materials for producing thermal management devices and electrical conducting devices, among numerous other multifunctional applications. Examples of applications include lightweight, high performance materials for aerospace structural and functional composites, lightning strike protection, EMI shielding, and directional thermal and electrical conducting applications in materials and devices. In one embodiment, the methods are used to make continuous nanotube membranes or buckypapers materials for constructing long and continuous thermal and electrical paths using carbon nanotubes in large structures or devices.

In one embodiment, a method is provided for making nanocomposite material. The method includes the steps of impregnating pores of the continuous membrane of nanoscale fibers, made by the continuous fabrication methods described herein, with a liquid matrix material; and then solidifying the liquid matrix material. The impregnation step can be done by essentially any means which permits or forces the liquid matrix material to infiltrate the pores (e.g., spaces between nanotubes) in the continuous membrane of nanoscale fibers.

The infiltration can be achieved with the aid of gravity, vacuum pressure, direct pressure means (e.g., hot press techniques), or a combination thereof. In addition, or alternatively, the impregnation process may be facilitated by the use of dilute, low viscosity solutions of the matrix material, to assist the material's penetration into the nanoscale porous structure of the buckypaper. The infiltration can be done in a continuous or batch process.

The step of solidifying the matrix material can be based on a chemical reaction, temperature, pressure or a combination thereof. In one embodiment, the fluid matrix material comprises a crosslinkable matrix material and the solidifying step comprises a reaction which crosslinks the matrix material. For example, the fluid matrix material could comprise a matrix material at a temperature below the temperature effective to initiate cross-linking of the matrix material, and then the fluid matrix material could be heated to a temperature and for a time effective to cause the matrix material to self-crosslink. These methods could be used with thermoset polymers and polymer precursors, such as epoxies.

In one embodiment, a nanoporous sheet of SWNT buckypapers is impregnated with an epoxy or other resin liquid material. The liquid material is then hardened to form the nanotube-reinforced structural material. Such composite materials have a wide range of applications, for example, where high strength (e.g., as measured by storage modulus) is important.

A wide variety of materials can be used as the matrix material. Selection of the appropriate material depends on the end use of the composite as well as the particular techniques employed to fluidize and solidify the matrix material. Examples of suitable matrix materials include polymers, ceramics, glasses, metals, alloys, and other composites. In one embodiment, the matrix material is polymeric. That is, it comprises one or more oligomers, polymers, copolymers, or blends thereof. In one embodiment, the matrix material comprises a thermoplastic polymer. In another embodiment, the matrix material comprises a thermoset polymer, such as phenol formaldehyde resins and urea formaldehyde resins. Examples of polymers suitable for use in the process include polyolefins, polyesters, nonpeptide polyamines, polyamides, polycarbonates, polyalkenes, polyvinyl ethers, polyglycolides, cellulose ethers, polyvinyl halides, polyhydroxyalkanoates, polyanhydrides, polystyrenes, polyacrylates, polymethacrylates, polyurethanes, and copolymers and blends thereof. In one embodiment, the fluid matrix material comprises a polymer precursor or a crosslinkable material. As used herein, the term "polymer precursor" refers to monomers and macromers capable of being polymerized. As used herein, the term "crosslinkable material" refers to materials that can crosslink with themselves or with another material, upon heating or addition of a catalysts or other appropriate initiator. In one preferred embodiment, the polymer precursor comprises an epoxy resin. In another embodiment, the polymer precursor comprises a cyanoacrylate.

The matrix material may further include one or more processing additives. Examples include binding agents, surfactants, and wetting agents.

The methods and compositions can be further understood with the following non-limiting examples.

EXAMPLE 1

Continuous Production of Nanotubes Buckypapers Using Static Filter

Figure 2:
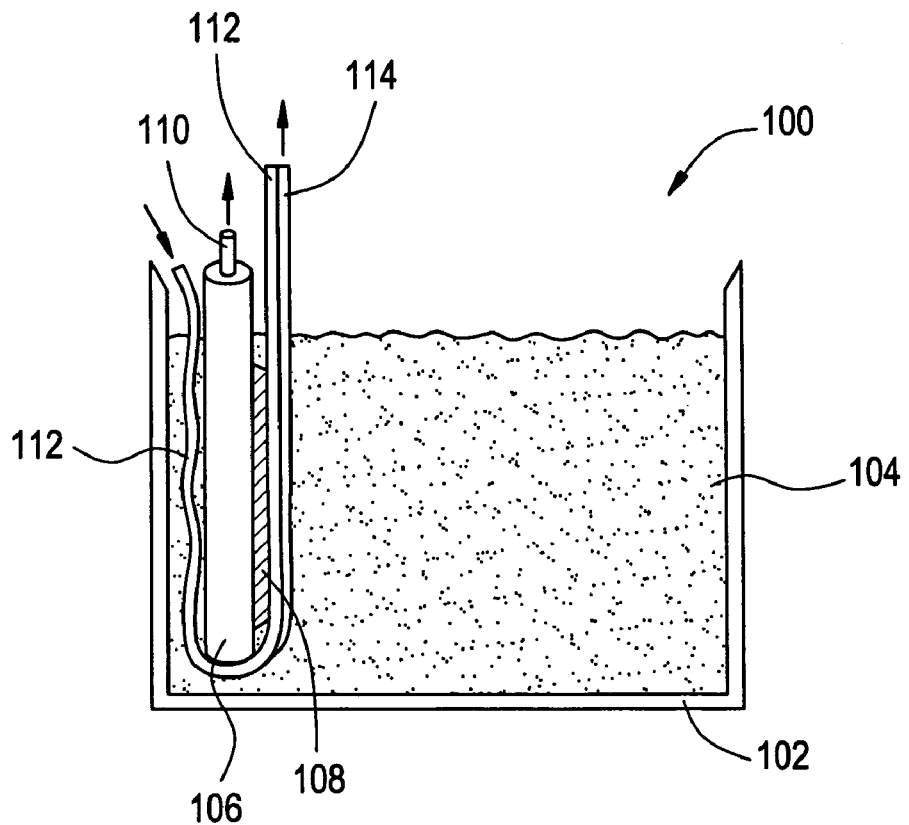
FIG. 2 is a cross-sectional view of the equipment set-up that was used to produce continuous nanotube buckypapers using a static filter design.
Figure 3:
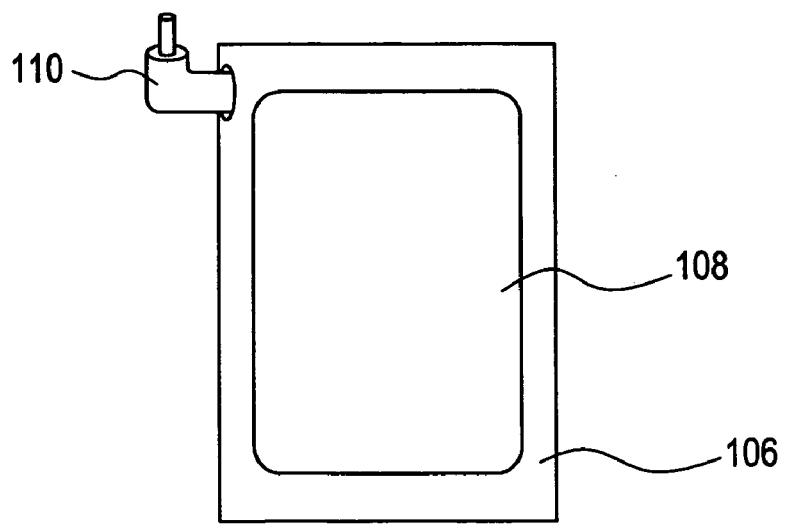
FIG. 3 is a plan view of the filter apparatus shown in FIG. 2.

A laboratory scale, static filter process was used to make continuous nanotube buckypapers. The equipment set up is shown in FIGS. 2 and 3. The processing system 100 included a beaker 102 which contained an aqueous suspension 104 of SWNTs, a filter cavity/housing 106, and a porous static filter 108. A filter membrane 112 was manually moved across the static filter 108 while a vacuum connected to filter outlet 110 was drawn to pull water from the suspension 104 through the porous filter 108 which was immersed in the suspension, thereby forming a continuous membrane, or thin film, of carbon nanotubes on the filter membrane, as it was withdrawn from the suspension. The static filter design equipment and process were effective to make a continuous buckypaper.

At times, the force required to keep the filter membrane moving was too great due to high vacuum or high filtration pressure, which damaged the filter membrane. It was found that filtration pressure could be reduced to move the filter membrane, which may lead to a step-by-step process for moving the membrane. During the step-by-step process, the required pressure is added in the process after the membrane has made the required move at a lower pressure, and then filtration is re-started. In these instances, the process was considered quasi-continuous, but nonetheless was effective to make continuous buckypapers.

EXAMPLE 2

Continuous Production of Nanotubes Buckypapers Using Dynamic Filter

A prototype dynamic filter was developed and used to produce continuous buckypapers by using a rotating filter to continuously move a filter membrane, which is drawn to the surface of the rotating porous filter by application of vacuum or mechanical pressure. The filter and membrane move together, such that the filter membrane moves on the surface of the filter during filtration to produce a continuous buckypaper material. The design could be useful to avoid direct application of force onto the filter membrane. Consequently, the rotating filter process will avoid breaks and large deformation of the filter membrane during continuous filtration, avoiding the step-by-step method and static filter design described in Example 1.

Figure 5A:
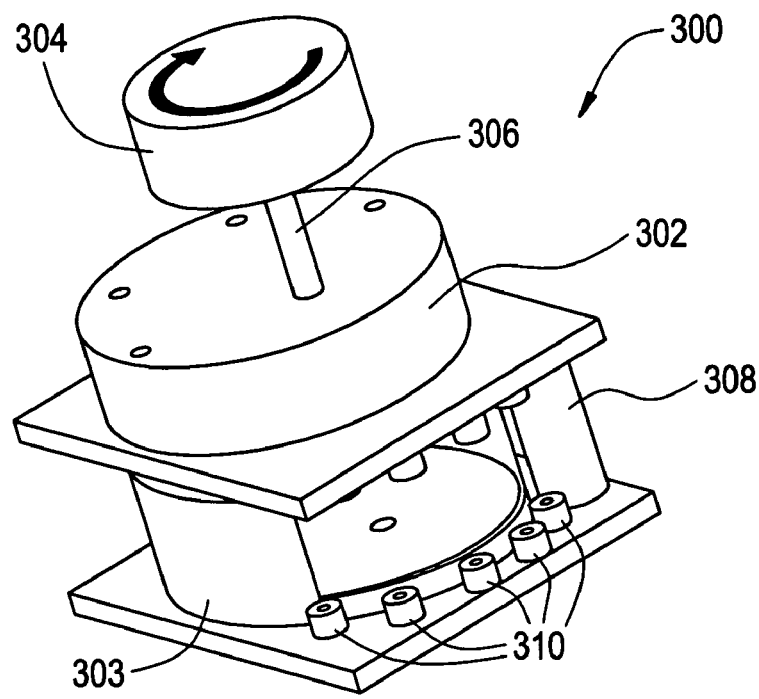
FIGS. 5A-B show one embodiment of an apparatus to produce continuous buckypapers by using a rotating filter to continuously move the filter membrane.
Figure 5B:
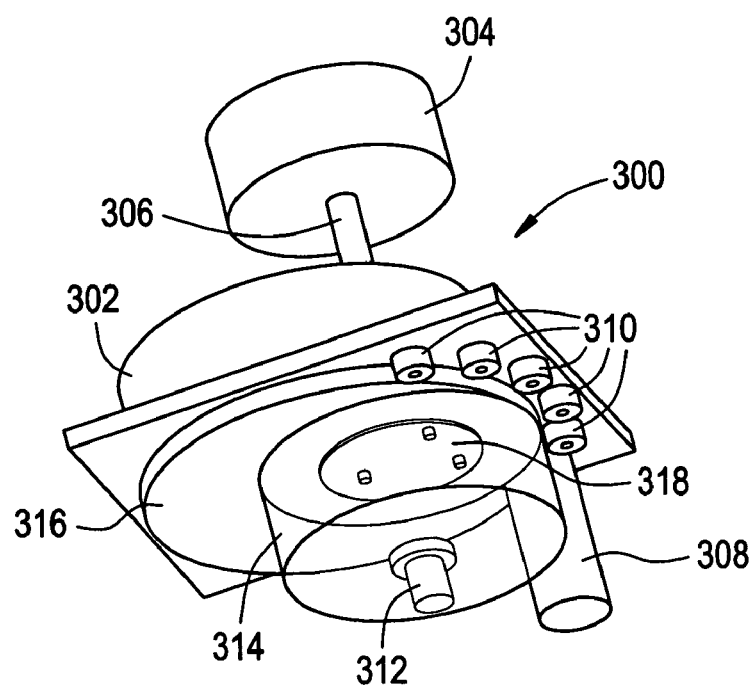

FIG. 5 illustrates the dynamic filter apparatus 300. It includes filter body portions 302 and 303, in which porous filter 314 rotates, and seal layer 316. The porous filter is mounted to rotational mount 318, which is connected to axel 306, which is connected to rotational member 304. A moving filter membrane (note shown) was fed across rotating porous surface of the filter 314 guided by roller 308 and wheels 310 for enhancing the seal of the filter membrane edge during the rotation of filter and movement of the filter membrane. A liquid outlet 312 conducted liquid out of the filter cavity.

A 35-inch long buckypaper was successfully produced with this device and method, and preliminary results show that the method will prove effective for producing quality nanotube membrane materials of unlimited length.

EXAMPLE 3

Continuous Production of Nanotubes Buckypapers Using Static Filter

Figure 6:
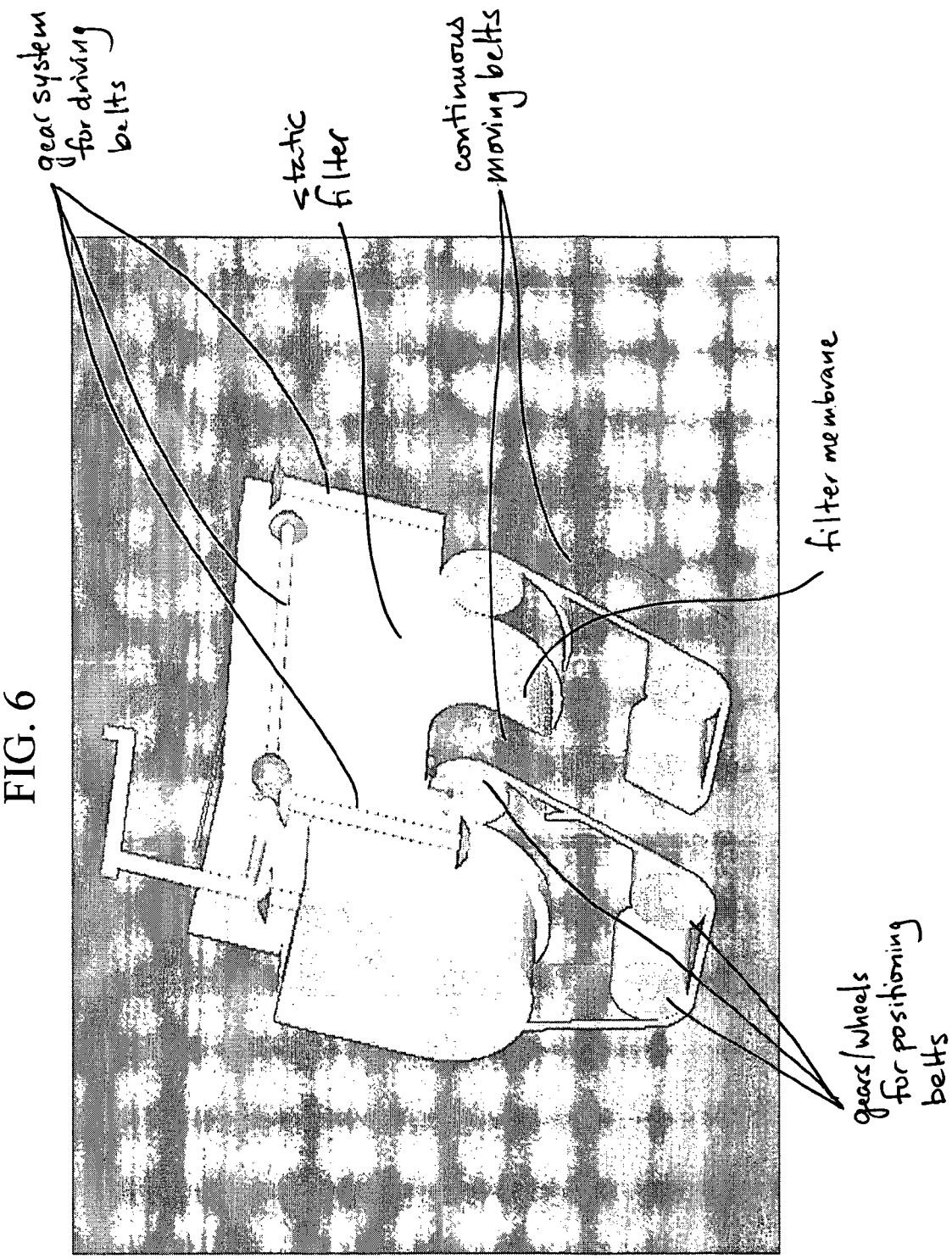
FIG. 6 is a perspective view of one embodiment of an apparatus to produce continuous buckypapers by using a static filter and a pair of moving belts to move a filter membrane across the filter.

A prototype static filter and moving belt apparatus was developed to secure and move a filter membrane during filtration, as shown in FIG. 6. The device was operated and experimental results show that this apparatus design is effective to continuously move the filter membrane and produce continuous buckypaper during filtration.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method for the continuous production of a network of nanotubes or other nanoscale fibers comprising:
   making a suspension of nanoscale fibers dispersed in a liquid medium; and
   filtering the suspension by moving a filter membrane through the suspension, into transitory contact with a filter element, such that the nanoscale fibers are deposited directly on the filter membrane as the fluid medium flows through the filter membrane, thereby forming a continuous membrane of the nanoscale fibers.

2. The method of claim 1, wherein the filter element is a static, porous filter element.

3. The method of claim 1, wherein the filter element is a dynamic, porous filter element.

4. The method of claim 1, wherein the filter element is a rotary element which is mechanically driven to rotate and at least partially assist in moving the filter membrane across the filter element.

5. The method of claim 1, wherein the filtering step is conducted within a magnetic field effective to align the nanoscale fibers.

6. The method of claim 1, wherein the nanoscale fibers comprises carbon nanotubes.

7. The method of claim 6, wherein the carbon nanotubes are single wall nanotubes.

8. The method of claim 1, wherein the suspension comprises SWNTs dispersed in a solvent selected from the group consisting of water, ether, acetonitrile, and combinations thereof.

9. The method of claim 1, wherein the suspension further comprises one or more surfactants.

10. The method of claim 1, wherein the nanoscale fiber concentration in the suspension is between about 40 and 500 mg/l.

11. The method of claim 1, wherein the suspension is subjected to sonication prior to the filtration step.

12. The method of claim 1, wherein the filtration step is conducted with the aid of vacuum to pull water through the filter membrane, applied pressure to press water though the filter membrane, or a combination thereof.

13. The method of claim 1, wherein the filter membrane comprises a polytetrafluoroethylene, a nylon, or a combination thereof.

14. The method of claim 1, wherein the filter membrane has pores having a size between about 0.1 µm and about 5 µm.

15. A method of making a nanocomposite material comprising:
impregnating pores of the continuous membrane of nanoscale fibers made by the method of claim 1 with a liquid matrix material; and then
solidifying the liquid matrix material.

16. The method of claim 15, wherein the liquid matrix material comprises a polymer precursor or thermoplastic polymer.

17. The method of claim 15, wherein the impregnation step is done with the aid of vacuum, direct pressure means, or both.

18. The method of claim 1, further comprising separating the continuous membrane of the nanoscale fibers from the filter membrane.

19. A method for the continuous production of a network of carbon nanotubes comprising:
making a suspension of carbon nanotubes dispersed in a liquid medium; and
filtering the suspension by moving a filter membrane through the suspension, into transitory contact with a filter element, such that the carbon nanotubes are deposited directly on the filter membrane as the fluid medium, with the aid of vacuum or applied pressure, flows through the filter membrane, thereby forming a continuous membrane of the carbon nanotubes.

20. The method of claim 19, further comprising separating the continuous membrane of the carbon nanotubes from the filter membrane.

21. A method for the continuous production of a network of nanotubes or other nanoscale fibers comprising:
making a suspension of nanoscale fibers dispersed in a liquid medium; and
filtering the suspension by moving a filter membrane through the suspension, into transitory contact with a filter element, such that the nanoscale fibers are deposited directly on the filter membrane as the fluid medium flows through the filter membrane, thereby forming a continuous membrane of the nanoscale fibers separable in an intact sheet form from the filter membrane.

* * * * *